July 6, 1937.  M. B. REACH  2,086,094

PLAY BALL

Filed July 6, 1936

Inventor:

Milton B. Reach,

By Spear, Donaldson + Hall

Attorneys.

Patented July 6, 1937

2,086,094

UNITED STATES PATENT OFFICE 2,086,094

PLAY BALL

Milton B. Reach, Springfield, Mass., assignor to A. G. Spalding & Bros., New York, N. Y., a corporation of New Jersey Application July 6, 1936, Serial No. 89,190

9 Claims. (Cl. 273—58)

The invention relates to play balls, and an object is to provide a ball having raised portions similar to those present along the seams in the known types of balls, such as those employing stitching.

Another object is to provide such raised portions in a novel manner and construction in a molded play ball.

Figure 1:
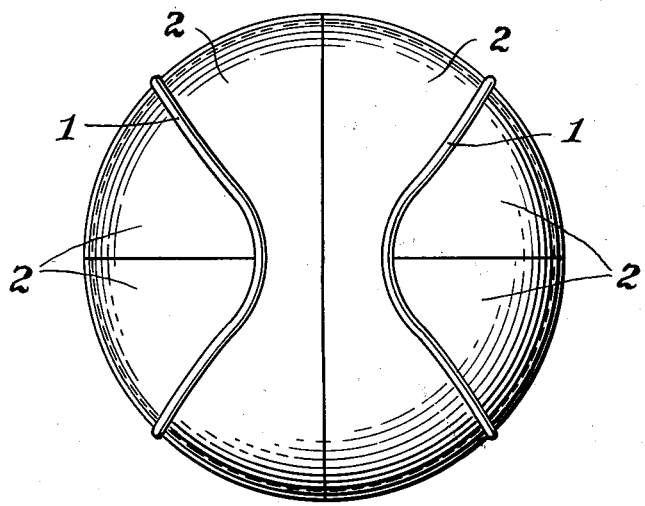
Figure 1 is a view of the ball embodying my invention.
Figure 2:
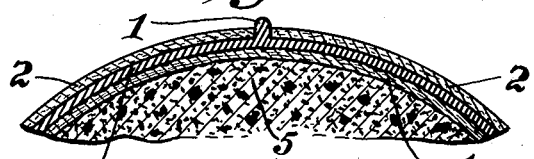
Fig. 2 is a fragmental sectional view of the same.
Figure 3:
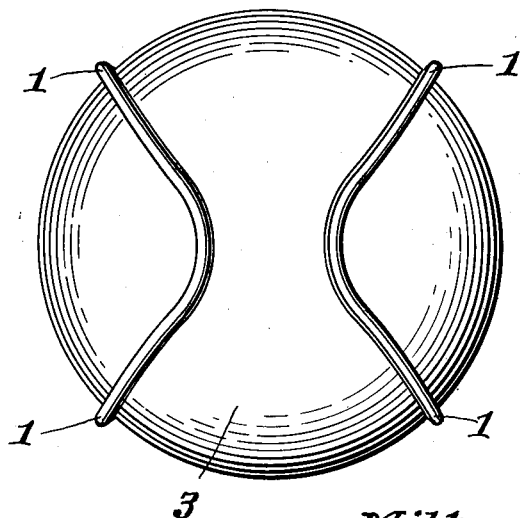
Fig. 3 is a view of the molded ball before the application of the veneer cover.

Referring to the drawing, 1 represents the molded rib or raised portion of the present invention, and 2 represents the veneer or cover with its edges in abutting relation to the ribs or raised portions 1 and cemented to the smooth molded surface 3 of the ball and with the edges of the veneer cemented to the sides of the raised portion 1 of the molded ball.

The ball as molded is made in the same way as set forth in my application filed April 28, 1936, Serial No. 76,810, except that in the molding operation, instead of employing a smooth mold, a mold is used having a figure 8 pattern or groove cut in it, producing the ridge or rib 1 on the molded surface of the ball in this figure 8 pattern. The ridge or rib 1 is of a height sufficient to extend beyond the thickness of the veneer or cover as shown in Fig. 1. A figure 8 pattern or raised portion 1 is thus produced on the surface of the complete ball, which raised portion will react to air currents in pitching just as do the stitched raised portions in the standard type of ball, and which also acts as a finger hold for the pitcher.

The molded raised portion 1 protruding beyond the cover of the ball is provided in view of the desire on the part of professional pitchers and others for a ball having such raised portions as are present along the seams in the present balls, which enable the pitcher or player to better grip and to control the pitched ball as for controlling curve.

The molded sheath or layer 3 with its ribs or raised portions 1 molded integrally therewith are preferably of rubber and beneath the rubber is the fibrous winding or layer 4, overlying the molded center or core 5 of the ball, which center may be of cork or the like composition.

The sides of the rib or raised portion 1 are shaped so that the edges of the cover or veneer of leather or the like will readily fit and conform thereto, and as shown, they are preferably relatively straight and parallel.

I claim:

1. A play ball including a molded surface and having ridge portions molded integrally with said molded surface, and a veneer cover applied to said molded surface with the edges of said veneer in abutting relationship with the sides of said ridge portions.

2. A play ball including a molded surface and having ridge portions molded integrally with said molded surface, and a veneer cover applied to said molded surface with the edges of said veneer in abutting relationship with the sides of said ridge portions, and cemented thereto.

3. A play ball including a molded surface and having ridge portions molded integrally with said molded surface, and a veneer cover applied to said molded surface and abutting said ridge portions, said veneer cover being of a thickness less than the height of said ridge portions, with the ridge portions extending outwardly beyond said cover.

4. A play ball including a molded surface and having ridge portions molded integrally with said molded surface, and a veneer cover applied to said molded surface with the edges of said veneer in abutting relationship with the sides of said ridge portions, said veneer cover being of a thickness less than the height of said ridge portions with the ridge portions extending outwardly beyond said cover.

5. A play ball according to claim 4 in which said veneer cover is cemented to said molded surface and with its edges cemented to the sides of said rib portions.

6. A play ball according to claim 4 in which said molded surface and integral ridge portions are of rubber and said veneer cover is of leather or the like.

7. A play ball according to claim 4 in which the sides of the said ridge portions are relatively straight to conform to the abutting edges of said veneer cover.

8. A play ball having a veneer cover and a surface beneath said cover providing a rib member extending beyond the outer surface of the cover and between adjacent edges of the cover.

9. A play ball according to claim 8 in which said rib member has relatively straight side walls conforming with the abutting edges of the veneer cover.

MILTON B. REACH.